United States Patent [19]

Mezrich et al.

[11] 4,123,944
[45] Nov. 7, 1978

[54] PORTABLE ULTRASONIC MEASUREMENT SYSTEM

[75] Inventors: Reuben S. Mezrich, Rocky Hill; Cheston W. Robbins, Robbinsville, both of N.J.

[73] Assignee: The United States of America as represented by the Department of Health, Education and Welfare, Washington, D.C.

[21] Appl. No.: 865,712

[22] Filed: Dec. 29, 1977

[51] Int. Cl.² ............................................. G01N 29/00
[52] U.S. Cl. ................................................... 73/657
[58] Field of Search ................ 73/657, 605, 655, 656, 73/645, 646, 647, 648, 603, 604; 340/5 H

[56] References Cited

U.S. PATENT DOCUMENTS

| 3,576,521 | 6/1967 | Silverman ........................ 73/646 X |
| 3,969,578 | 7/1976 | Mezrich et al. ................... 73/603 X |

*Primary Examiner*—Jerry W. Myracle
*Attorney, Agent, or Firm*—Browdy and Neimark

[57] ABSTRACT

A portable apparatus for measuring ultrasonic signal waves using interference between a reference reflected laser beam and one reflected from a gold-coated plastic film exposed to the sonic signal and located at the interface between liquids of different viscosity but which have substantially equal acoustic impedances. The liquids may respectively comprise water and fluorocarbon liquid.

10 Claims, 1 Drawing Figure

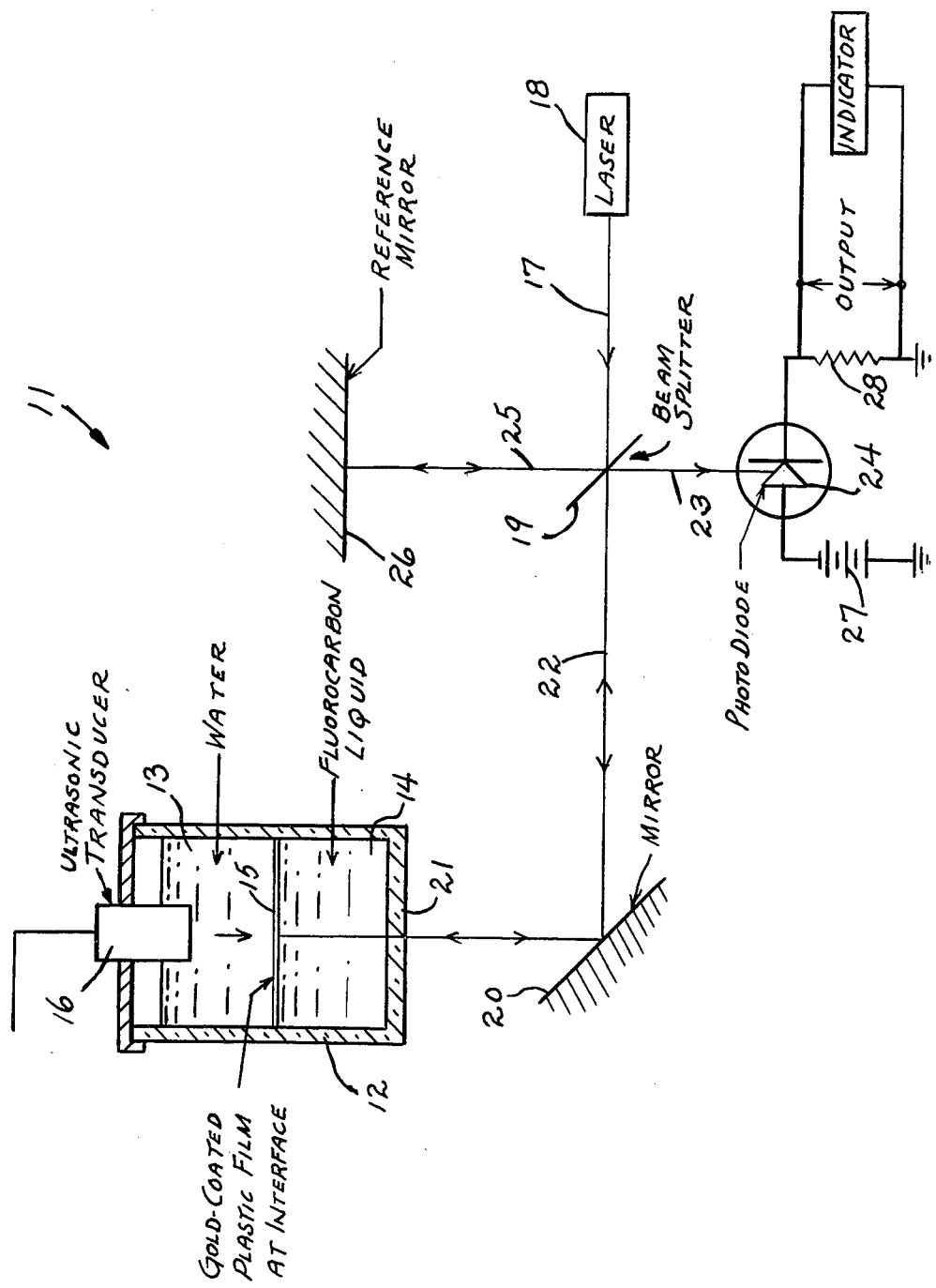

PORTABLE ULTRASONIC MEASUREMENT SYSTEM

FIELD OF THE INVENTION

This invention relates to apparatus for measuring ultrasonic waves, and more particularly to an ultrasonic wave-measuring apparatus of the type using interference between a laser beam reflected from a sonified test element and a reference reflected laser beam.

BACKGROUND OF THE INVENTION

Various means have been proposed in the prior art for the measurement of ultrasonic waves by using the Principle of interference. For example, one prior means employs a thin flexible reflective film suspended in water through which acoustic waves pass, and wherein the motion of the film is measured interferometrically. This and similar prior systems have the virtues of high sensitivity, large frequency response, large angular range and large dynamic range, but have several serious drawbacks.

Firstly, since the flexible film is suspended inside a water tank, sound passing through it can (and usually will) strike the walls of the tank and be reflected back through the film. This reflection will interfere with the transmitted wave and will cause an erroneous reading. Secondly, since the film must be quite thin (of the order of 6 microns) and is very delicate, it is sensitive to the large, low-frequency motions of the water caused by normal ambient vibrations and other disturbances. If small, these motions cause no harm. However, if they are large, a laser beam reflected from the film can be sufficiently displaced so as to severely reduce the interference and hence adversely affect the output signal. In extreme cases the reflected light beam may even miss the detection diode completely.

Embodiments of prior systems as above described may be found in prior U.S. patents, and examples of such prior patents are the following, noted during a preliminary search: U.S. Pat. Nos., Stetson et al, 3,434,339; Green, 3,711,823; Langlois, 3,964,052; Mezrich et al, 3,969,578; Erikson, 3,990,296.

SUMMARY OF THE INVENTION

An object of the present invention is to provide a novel and improved portable ultrasonic measurement system. Another object is to overcome deficiencies of prior art systems such as those noted above.

A further object of the invention is to provide an improved ultrasonic measuring apparatus which has high sensitivity, large frequency response, large angular range, large dynamic range, which does not give erroneous readings because of uncontrolled internal sonic reflections, and which is free of error-causing optical disturbances due to ambient vibrations.

A still further object of the invention is to provide an improved ultrasonic measuring apparatus of the optical interferometric type employing a laser beam with a flexible reflective film suspended in water in a tank and exposed to acoustic waves, wherein sound passing through the film will not strike the walls of the tank and be reflected back through the film, whereby to prevent erroneous interferometric readings, and wherein low frequency motions and vibrations of the measurement tank will be highly damped, whereby to prevent undesired excessive deviations of the reflected laser beam employed with the optical system.

The apparatus of the present invention employs a simple and novel method intended to overcome the above-described problems while maintaining the good features of the basic interferometric system, said new method greatly facilitating the design of a portable ultrasonic wave measurement system wherein the two above-mentioned main problems are eliminated. The basic concept embodied in the new method is to locate the measurement surface at the interface between two liquids of substantially equal acoustic impedance. One of the liquids can be water. The other liquid must then have a relatively great viscosity, should be immiscible in the first liquid, and must be optically transparent.

Two features of a highly viscous fluid are employed in the apparatus of the present invention. The first is that the ultrasonic waves are quickly attenuated in the viscous medium, with the result that the multiple reflections discussed above are significantly reduced. In fact, it has been found experimentally that only 1 cm of a 10,000 centisoke fluorocarbon fluid is enough to reduce these reflections to immeasurably low levels. The second feature is that gross, low-frequency motions of the measurement tank are highly damped (and attenuated), and so the deviations of the reflected laser beam mentioned above are greatly reduced.

If the acoustic impedance of the two fluids are equal, then there will also be no reflections produced at the interface. This is an important consideration in measurement systems, especially if continuous waves are being monitored, since one must be certain that only the primary wave is being measured.

Note that it is not crucial that the acoustic velocities (or densities) be equal, since the reflection at an interface is approximately related to the difference in acoustic impedance. (Actually, at large angles of incidence this approximation fails, but even for angles of 15° the reflection amplitude is less than 3% and this effect can be neglected).

The interface must be transparent to sound but highly specularly reflective to light. There are a number of possible ways to meet these conditions. One way is to use fluids of highly dissimilar optical refractive indices. Since the interface reflectivity R is related to the indices of refraction $n_1$, $n_2$ of the fluids by $$R = [n_1 - n_2/n_1 + n_2]^2$$

the difference must be quite large, and in fact if one of the fluids is water, the index of the other medium must be 0.23 or 7.3 to produce even a 50% intensity reflectivity. This is normally difficult to achieve.

A second method would be to use a multiplicity of thin fluid layers at the interface to develop a $\lambda/2$ type optical reflecting layer. Such a method could be developed by choosing fluids of the proper optical index and proper specific gravity to ensure the desired ordering of layers.

A more reasonable method is to use metallic flakes with a density less than that of the viscous fluid and greater than that of water, so that the flakes float at the surface. This has been achieved experimentally, and while adequate for some purposes, the surface did not have the specular reflectivity necessary for high sensitivity detection. In this experiment the surface appeared diffuse, but the method still remains theoretically feasible even for high sensitivity detection.

A related method employed a metal layer evaporated (or sputtered) onto the viscous fluid and then covered by water. This gave a reflective surface but one which proved to be too fragile for most practical use.

The final method found to be practical is to place (or actually float) a metal-coated, preferably gold-coated, plastic film at the interface. The arrangement provides the required performance as above discussed. Acoustic waves passing through the film are quickly attenuated, and ambient motions are damped. Fluids of high viscosity found to be satisfactory are fluorocarbons (produced by Halocarbon Corp., of Hackensack N.J.) with a viscosity of 10,000 to 20,000 centisokes, an acoustic velocity of approximately 1,000 met/sec, and an acoustic impedance nearly equal to that of water.

BRIEF DESCRIPTION OF THE DRAWING

Further objects and advantages of the invention will become apparent from the following desrpition and claims, and from the accompanying drawing wherein the single FIGURE is a simplified schematic diagram of an improved portable ultrasonic wavefront measurement system according to the present invention.

DESCRIPTION OF A PREFERRED EMBODIMENT

Referring to the drawing, 11 generally designates an acoustic wavefront measurement apparatus constructed in accordance with the present invention. The apparatus 11 comprises a main tank 12 of suitable, preferably optically transparent, rigid material containing water or other suitable liquid 13 in its upper portion and highly viscous liquid 14 in its lower portion, the liquid 14 preferably being immiscible in the first liquid, being optically transparent, and having an acoustic impedance almost equal to that of the first liquid. As above mentioned, the fluid 14 may comprise fluorocarbon liquid, such as that produced by Halocarbon Corp. of Hackensack, N.J., with a viscosity of 10,000 to 20,000 centisokes, an acoustic velocity of approximately 1000 met/sec, and an acoustic impedance near that of water.

A gold-plated flexible plastic film 15 is suspended at the interface between the water 13 and the fluorocarbon liquid 14. For example, the gold-coated plastic film 15 may actually float on the fluorocarbon liquid 14 at said interface. It will be apparent that the density of the film 15 is suitably intermediate of that of the two liquids, it being desirable that the lower liquid be heavier than the upper liquid. Alternatively, the film 15 can be anchored in place in the tank in which case the film 15 acts as a separator between the liquids, which need not be immiscible, in which case the relative densities are unimportant.

An ultrasonic transducer 16 whose acoustic wave output is to be measured is suitably mounted in the top portion of tank 12, immersed in the water 13 in acoustic coupling relation therewith. The film 15 is quite thin, of the order of 6 microns in thickness, and is movable responsive to acoustic waves from transducer 16. However, acoustic waves passing through the film are quickly attenuated in the viscous medium 14, so that the acoustic energy reflected back through the film is relatively insignificant. Also, since the acoustic impedances of the two fluids 13 and 14 are substantially equal, there will be no reflections at the interface therebetween. Furthermore, gross low-frequency motions of the measurement tank 12 are highly damped and attenuated, so that ambient deviations of the film 15 are minimized.

The output beam 17 from a laser 18 passes through a conventional 45° half-silvered mirror beam splitter 19. An exit beam 22 impinges on a 45° stationary mirror 20 and is directed vertically upwardly through the optically transparent bottom wall 21 of tank 12 and is returned by reflection from the horizontal gold-plated film 15, being again reflected by stationary mirror 20 to the 45°-inclined half-silvered beam splitter mirror 19 and joins a composite beam 23 which impinges on a detection photo diode 24. The beam splitter 19 provides a reference beam 25 which is reflected back from a reference mirror 26 and which passes through the beam splitter 19 and forms part of the composite exit beam 23. The return measuring beam 22 and the return reference beam 25 form the composite exit beam 23, containing interferometric data in accordance with the surface displacements of the film 15 produced by the acoustic waves emanating from transducer 16. The interference patterns detected by the photo diode 24 are the results of phase shifts in the measuring laser beam component relative to reference beam component 25, and said phase shifts are caused by the acoustic wave-induced displacements of the reflective film element 15. This interferometric action is more fully described, for example, in U.S. Pat. No. 3,969,578 to Mezrich et al.

The photo diode 24 is connected in a suitable indicating circuit, for example, including an energizing battery 27 and a load resistor 28, across which the output signal of the apparatus can be obtained. The output signal may be analyzed in any suitable manner, for example, may be handled so as to form a video signal for display on a cathode ray tube in the manner described in said U.S. Pat. No. 3,969,578.

As above mentioned, multiple reflections of the acoustic waves in the tank 12 are substantially eliminated and gross low-frequency motions of the tank caused by ambient conditions are highly damped and attenuated, so that there is substantial avoidance of erroneous readings which otherwise might have been caused by such multiple reflections and ambient motions.

While a specific embodiment of an improved acoustic wavefront measurement apparatus has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. An acoustic interferometer apparatus comprising a receptacle having an optically transparent bottom wall portion, an optically transparent, relatively high-viscosity first liquid in the lower portion of said receptacle, a sound-transmitting second liquid thereover, said liquids having substantially equal acoustic impedances, means to couple an acoustic transducer under test to said second liquid, an acoustically drivable optically reflective horizontal film element at the interface between said liquids, a source of coherent monochromatic radiation, means to direct coherent radiation from said source through said transparent bottom wall portion to said reflective film element so as to be reflected therefrom and to define a measure beam whose path length varies in accordance with vertical movements of said film element, means generating a fixed path-length reference beam from said source, and means to combine the measure and reference beams to form a composite interference beam.

2. The acoustic interferometer apparatus of claim 1, and photosensitive electrical detector means in the path of said composite beam, and indicating circuit means connected to said detector means.

3. The acoustic interferometer apparatus of claim 2, and wherein said film element comprises a thin film of reflective metal-coated plastic material.

4. The acoustic interferometer apparatus of claim 2, and wherein said second liquid comprises water.

5. The acoustic interferometer apparatus of claim 4, and wherein said first liquid comprises fluorocarbon liquid.

6. The acoustic interferometer apparatus of claim 4, and wherein said first liquid comprises fluorocarbon liquid with a viscosity of between 10,000 and 20,000 centisokes.

7. The acoustic interferometer apparatus of claim 6, and wherein said film element comprises a thin film of reflective metal-coated plastic material floating on said first liquid at said interface, said first liquid being immiscible with said second liquid.

8. The acoustic interferometer apparatus of claim 6, and wherein said radiation source comprises a laser.

9. The acoustic interferometer apparatus of claim 8, and wherein said means generating said fixed path-length reference beam comprises a half-silvered mirror beam splitter located in the path of the output beam of the laser, angled to divert a portion of said laser output beam, and mirror means located to redirect said diverted output beam portion back through the beam splitter.

10. The acoustic interferometer apparatus of claim 9, and wherein the means to combine the measure and reference beams comprises additional mirror means located between the beam splitter and said receptacle and angled to return the measure beam to said beam splitter after reflection from said film element, said beam splitter being oriented to combine the returned measure beam and the reference beam into said composite interference beam.

* * * * *